United States Patent

[11] 3,632,312

[72] Inventor Walfred W. Jukkola
 Westport, Conn.
[21] Appl. No. 736,477
[22] Filed June 12, 1968
[45] Patented Jan. 4, 1972
[73] Assignee Dorr-Oliver Incorporated
 Stamford, Conn.

[54] PRODUCTION OF HIGH-STRENGTH SULFUR DIOXIDE
 8 Claims, 1 Drawing Fig.
[52] U.S. Cl. .................................................... 23/177,
 23/1 F, 75/9
[51] Int. Cl. .................................................... C01b 17/52,
 C21b 1/00
[50] Field of Search .......................................... 23/177,
 178, 179, 1 F; 75/9

[56] References Cited
 UNITED STATES PATENTS
3,042,498  7/1962  Norman .................... 23/177 X
2,689,787  9/1954  Ogarzaly et al. .......... 23/177 X
  212,508  2/1879  Robinson .................. 75/9
1,344,905  6/1919  Laist et al. ............... 23/179
3,047,365  7/1962  Jukkola .................... 23/179

OTHER REFERENCES

Kalbach, " Improving Solids-Gas Contacting by Fluidization" Chemical and Metallurgical Engineering, pages 94–98 (June 1944).

Primary Examiner—Oscar R. Vertiz
Assistant Examiner—Charles B. Rodman
Attorneys—Burtsell J. Kearns and T. M. Jablon ABSTRACT: Roasting sulfide ore to produce high-strength $SO_2$ using steam as the fluidizing agent and commercial grade $O_2$ as the oxidizing agent to produce a mixture of $SO_2$ and steam and condensing the steam to produce high-strength $SO_2$ with reduced or negligible dilution by atmospheric gases.

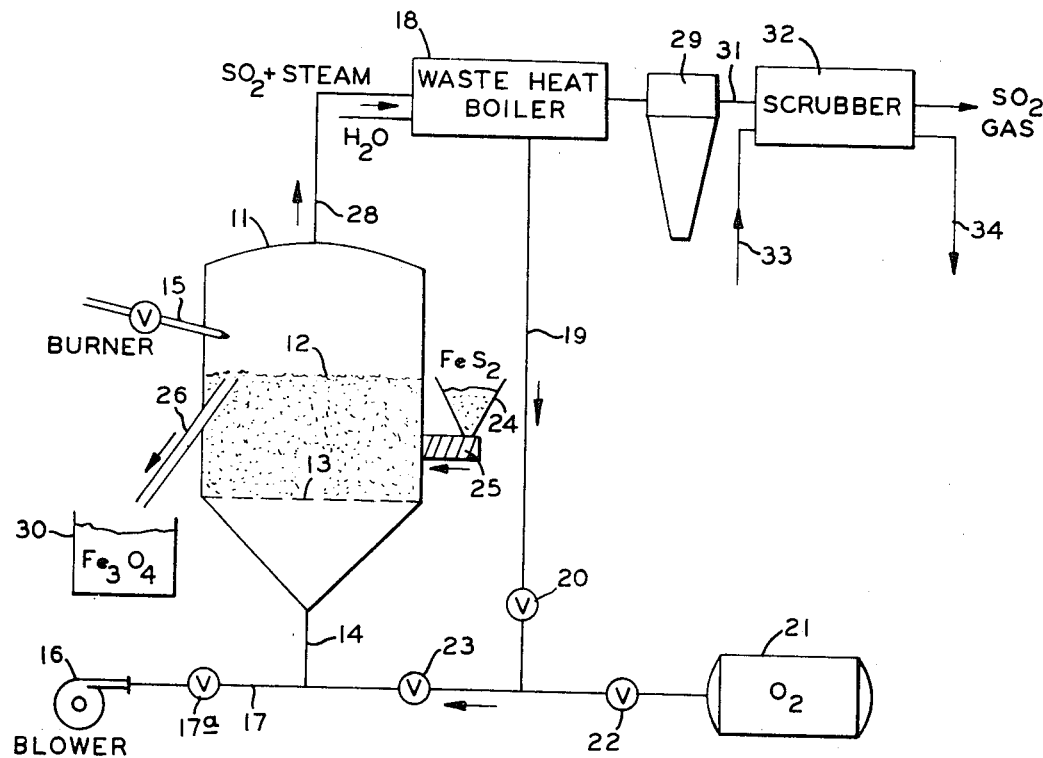
INVENTOR.
WALFRED W. JUKKOLA
BY
George S Hastings
ATTORNEY.

PRODUCTION OF HIGH-STRENGTH SULFUR DIOXIDE

Heretofore it has been an accepted way to produce sulphur dioxide gas by roasting the sulphur-bearing ores such as iron sulphide in finely divided condition in a fluidized bed. In this type of roasting it has been the practice to fluidize the finely divided bed of sulphur-bearing ore, or the inert residues therefrom, in a roasting chamber by blowing air through an air permeable support upwardly through the bed with sufficient velocity to render the material turbulent and fluidized. This air also provides the oxidizing agent. The bed is normally heated to roasting temperature and produces exhaust gases containing a mixture of sulphur dioxide diluted with atmospheric gases such as nitrogen, generally resulting in 12 to 16 percent sulphur dioxide.

It is the principal object of this invention to provide ways and means for treating sulphur-bearing ores such as iron sulphide in such a manner as to produce a gas having a much higher sulphur dioxide content than that obtainable by the conventional fluidized bed roasting. To this end, it is an object of this invention to provide a process and apparatus for roasting sulphide ores in a fluidized bed with reduced or negligible use of atmospheric oxygen with its attendant high proportion of nitrogen.

This invention involves the concept of utilizing steam as the fluidizing medium and utilizing commercial grade oxygen as the oxidizing agent either to enrich atmospheric oxygen or to take its place.

Still other objects are to provide convenient start-up means overcoming the start-up problems which result from the use of steam and also to utilize the waste heat from the roasting to furnish at least in part the steam for fluidizing.

In summary, after startup the ore bed is fluidized by steam and the oxidizing of the $FeS_2$ by commercial oxygen produces $SO_2$ gas and $Fe_3O_4$ as the solid product. The steam associated with the $SO_2$ exhaust gas is readily removed by passing the exhaust gases through a wet scrubber supplied with cooling water which condenses out the steam and passes on the relatively pure $SO_2$. Because the $SO_2$ is not diluted by atmospheric nitrogen in the fluidizing gas, the $SO_2$ is of high strength on the order of 80 to 90 percent $SO_2$. While $Fe_3O_4$ is the predominant solid product it should be understood that minor amounts of other iron oxides may result.

In the drawings, the FIGURE shows a diagrammatic side view of the fluid bed reactor and associated flow diagram.

In this FIGURE, the reactor 12 is made up of a refractory outer wall 11 having an air-permeable support plate or constriction plate 13 through which uprising fluidizing gas from conduit 14 fluidizes the bed of finely ground ore or ore residue in the reactor.

To start the reactor burner 15 is operated until the bed 12 reaches roasting heat. To fluidize the bed at this time a blower 16 is operated through a valved conduit 17 to deliver the desired amount of fluidizing gas through conduit 14. At this time valve 23 which controls the supply of mixed oxygen and steam is closed. As soon as a roasting heat of approximately 900° C. is reached in the fluidized bed, burner 15 is turned off and further reaction results from the exothermic heat produced by the oxidizing of the ore.

Also at this stage, the blower air is turned off, valve 17a is closed, and valve 23 is opened which provides both fluidizing steam and oxidizing oxygen, the desired proportion of which is secured by adjusting valves 20 and 22. Steam is produced by the waste heat boiler 18 heated by the exhaust gases $SO_2$ and steam. Auxiliary heat may be applied to this boiler if it is insufficient for the needed steam production. Steam from the boiler passes to the valve 20 through conduit 19. Exhaust gases consisting of steam, $SO_2$ and excess oxygen with a negligible or reduced amount of atmospheric gases pass through exhaust 28 to waste heat boiler and through a cyclone 29 which separates most of the particulate matter from the gases.

From the cyclone the steam and $SO_2$ passes to a wet scrubber 32 continuously supplied with cold water through inlet 33 and outlet 34 which may be of the general type disclosed in the patent to DOYLE U.S. Pat. No. 2,621,754 in which the gas is forced into contact with the water and the steam condensed and which also removes any fine particles which escape the cyclone. However, any conventional condensing device may be utilized for condensing the steam out of the $SO_2$ gas. After the steam is condensed out of the gas, a relatively dry and strong $SO_2$ issues from the scrubber. By manipulating valve 17a and valve 22 any desired enrichment of atmospheric air may be employed up to the point where all atmospheric air is eliminated. By manipulating valves 20 and 22 any desired mixture of steam and oxygen may be delivered through pipe 14 to fluidize the bed 12 and oxidize the sulphide. The proportion of oxygen in the fluidizing gas is in the range of 20–25 percent oxygen, preferably a mixture of approximately four-fifths steam and one-fifth oxygen is used. In any case, there will be a reduced dilution of $SO_2$ by the atmospheric gases after removing the steam.

Finely ground sulphite ore is fed from hopper 24 by screw 25 into the bed 12 or alternatively, a slurry of finely ground sulphite may be so fed. The solid roasted product $Fe_3O_4$ is delivered through downspout 26 to bin 30.

By the foregoing process and apparatus $SO_2$ strengths up to between 85 and 90 percent may be obtained resulting in large decreases in volume of gas handled and therefore in the size of the various pieces of equipment required resulting in turn in large decreases in capital investment and, of course, decreasing the $SO_2$ purification problems.

It is noted further that applicant has, by the apparatus above described, solved a startup problem peculiar to the use of steam as a fluidizing medium. If one were to endeavor to fluidize with steam and oxygen alone, a cold bed, the result would be simply to condense the steam rather than fluidizing. By combining the use of atmospheric air for startup and for diluting the commercial oxygen when desired, applicant solves this startup problem and makes possible a flexible use of oxygen as the oxidizing agent either by the use of oxygen alone as the oxidizing agent or enriched atmosphere as such agent.

What is claimed is:

1. The process of roasting finely divided sulfide bearing ores in a fluidized bed,
   wherein said ore is subjected to a reaction whereby the metal component of the sulfide is converted to an oxide residue, and the sulfur to $SO_2$, which process comprises continuously feeding said ore to said bed,
   maintaining said bed in a state of fluidization by passing therethrough as a fluidizing gas a prepared mixture of oxygen and steam, substantially free of air, and wherein the proportion of oxygen is sufficient to satisfy the requirement of oxidizing said metal component to the oxide residue, and the sulfur to $SO_2$, and wherein the complementary proportion in the form of steam is such as to provide together with the oxygen, a total gas volume sufficient for maintaining the fluidized state of said bed, while maintaining said bed in a temperature range of from about 850° to about 950° C.
   discharging the gaseous product as exhaust gases from said bed, comprising the $SO_2$ gas resulting from said reaction along with said steam,
   condensing and removing said steam as water from said exhaust gases after the steam has served its purpose as part of the fluidizing gas, thereby producing a relatively pure or undiluted $SO_2$,
   and discharging excess residue from said bed.

2. The process defined in claim 1, in which at least part of the heat for producing said steam is supplied by said exhaust gases.

3. The process defined in claim 1, in which the proportion of oxygen in the gas supplied to the body is in the range of 20 percent to 25 percent oxygen.

4. The process defined in claim 1, in which said ore is iron sulfide, and in which the oxygen supplied is sufficient to satisfy the stoichiometric requirements of oxidizing the iron sulfide to $Fe_3O_4$ and the sulfur to $SO_2$.

5. The process defined in claim 1, in which the steam is supplied in an amount which dilutes the oxygen in the bed to approximately 4 parts of steam to 1 part of oxygen.

6. The process according to claim 2, which comprises subjecting the spent exhaust gases to cyclonic separation treatment for effecting removal of suspended solids from the gas.

7. The process according to claim 2, which comprises subjecting the spent exhaust gases to a wet scrubbing operation effecting condensation of the steam as well as the removal of solids from the gas.

8. The process according to claim 2, which comprises subjecting the spent exhaust gases to cyclonic separation treatment, and subjecting the resulting gas to a wet scrubbing operation effecting the condensation of the steam.

* * * * *